United States Patent [19]

Croteau

[11] Patent Number: 4,766,661
[45] Date of Patent: Aug. 30, 1988

[54] APPARATUS FOR APPLYING A FABRIC MATERIAL TO A FRAME

[75] Inventor: René Croteau, Contrecoeur, Canada

[73] Assignee: Les Produits Duvernay, Ltee, Canada

[21] Appl. No.: 942,294

[22] Filed: Dec. 16, 1986

[51] Int. Cl.$^4$ .............................................. B23P 17/02
[52] U.S. Cl. ..................................... 29/417; 29/281.4; 140/109
[58] Field of Search ................. 140/109; 209/403, 404, 209/405; 29/33 K, 417, 448, 281.4

[56] References Cited

U.S. PATENT DOCUMENTS

| | | | |
|---|---|---|---|
| 2,695,445 | 11/1954 | Johnson et al. | 29/417 |
| 2,753,897 | 7/1956 | Conrad | 29/238 X |
| 2,804,101 | 8/1957 | Johnson et al. | 29/33 K X |
| 3,851,684 | 12/1974 | Wyrick | 140/109 |

Primary Examiner—Mark Rosenbaum
Assistant Examiner—Frances Chin
Attorney, Agent, or Firm—Bacon & Thomas

[57] ABSTRACT

An apparatus and a method for applying a fabric material to a rectangular frame having a fabric retention groove along respective side members thereof. The apparatus comprises a support structure having a planar frame support which is comprised of two pairs of opposed parallel frame engaging members. One of the frame engaging members of each of the pairs is an adjustably displaceable member. Each frame engaging member has one or more gripping elements for holding respective ones of the side members of the frame along a substantially straight axis and actuable to release the side members. A jaw member is provided to position a predetermined length of the fabric material over the frame to overlie the fabric retention groove of the frame side members. A spline cord positioner is displaceable in alignment with the retention grooves for applying a spline cord in the grooves from above the fabric material to retain the material therein. A fabric cutting device is also displaceable across the fabric for severing same from a supply roll. The fabric may be a wire cloth screen fabric, a sheet of plastic or fiberglass material, a silk screen sheet, or the like fabrics which may require to be attached to such frames.

38 Claims, 5 Drawing Sheets

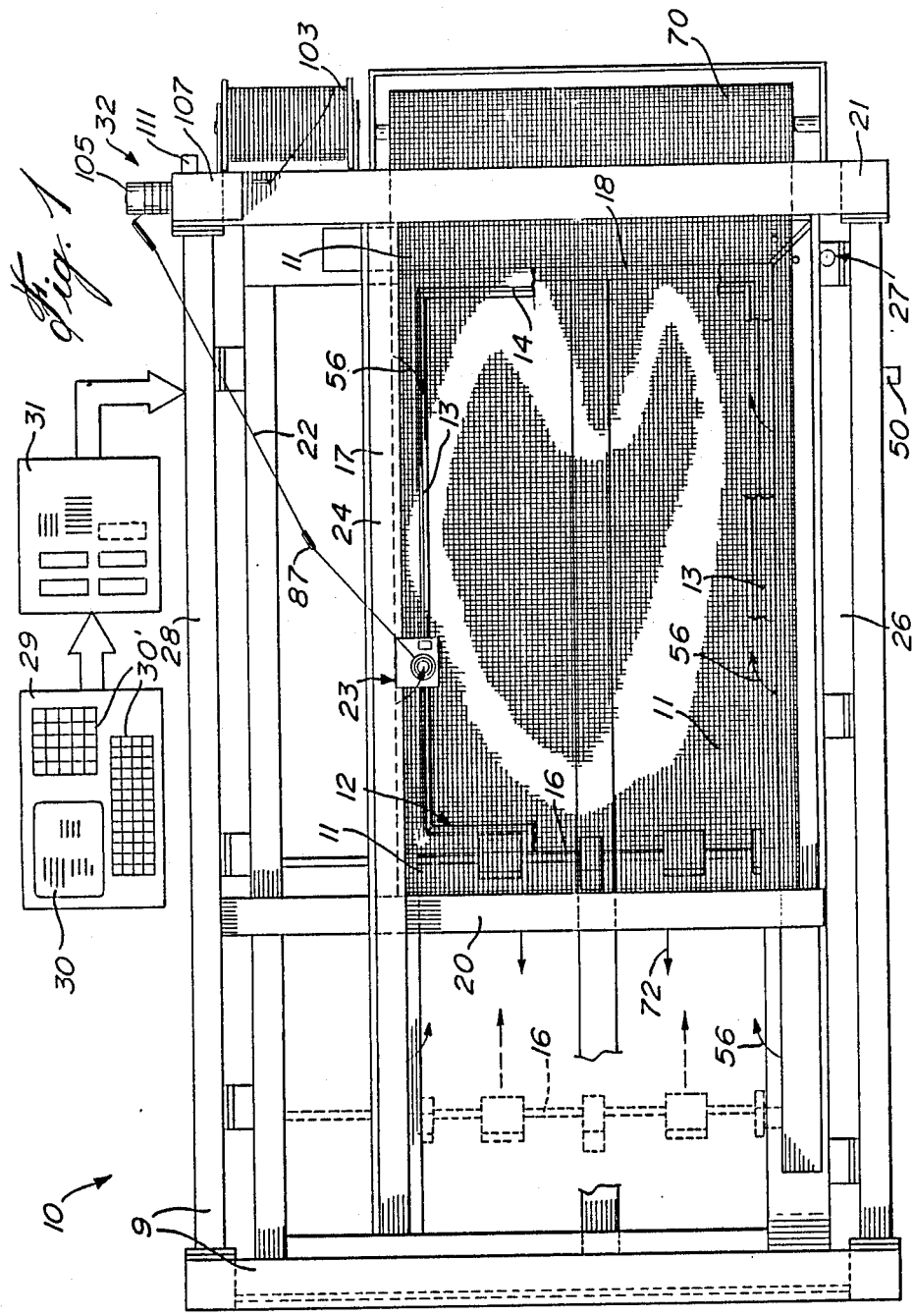

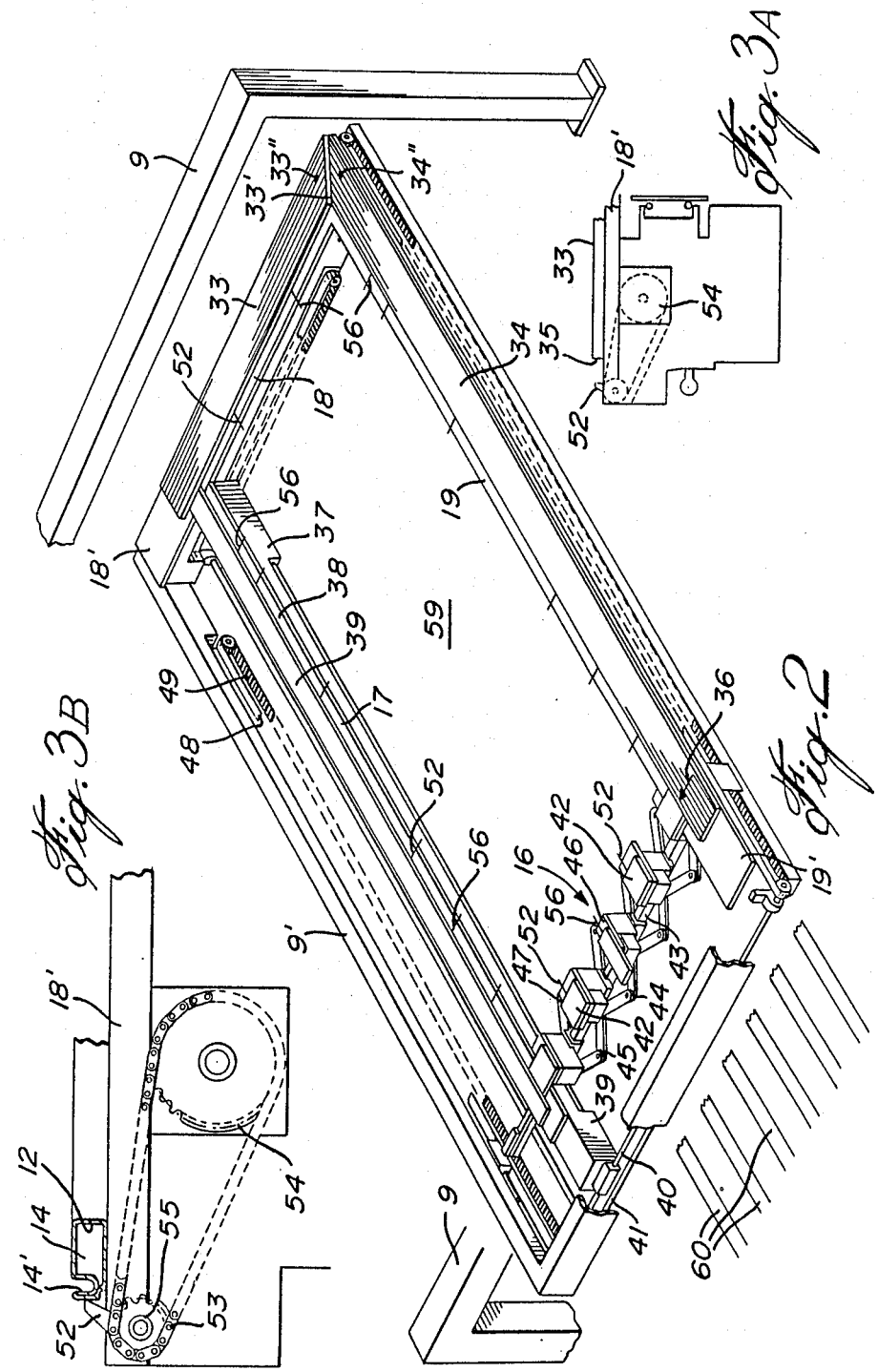

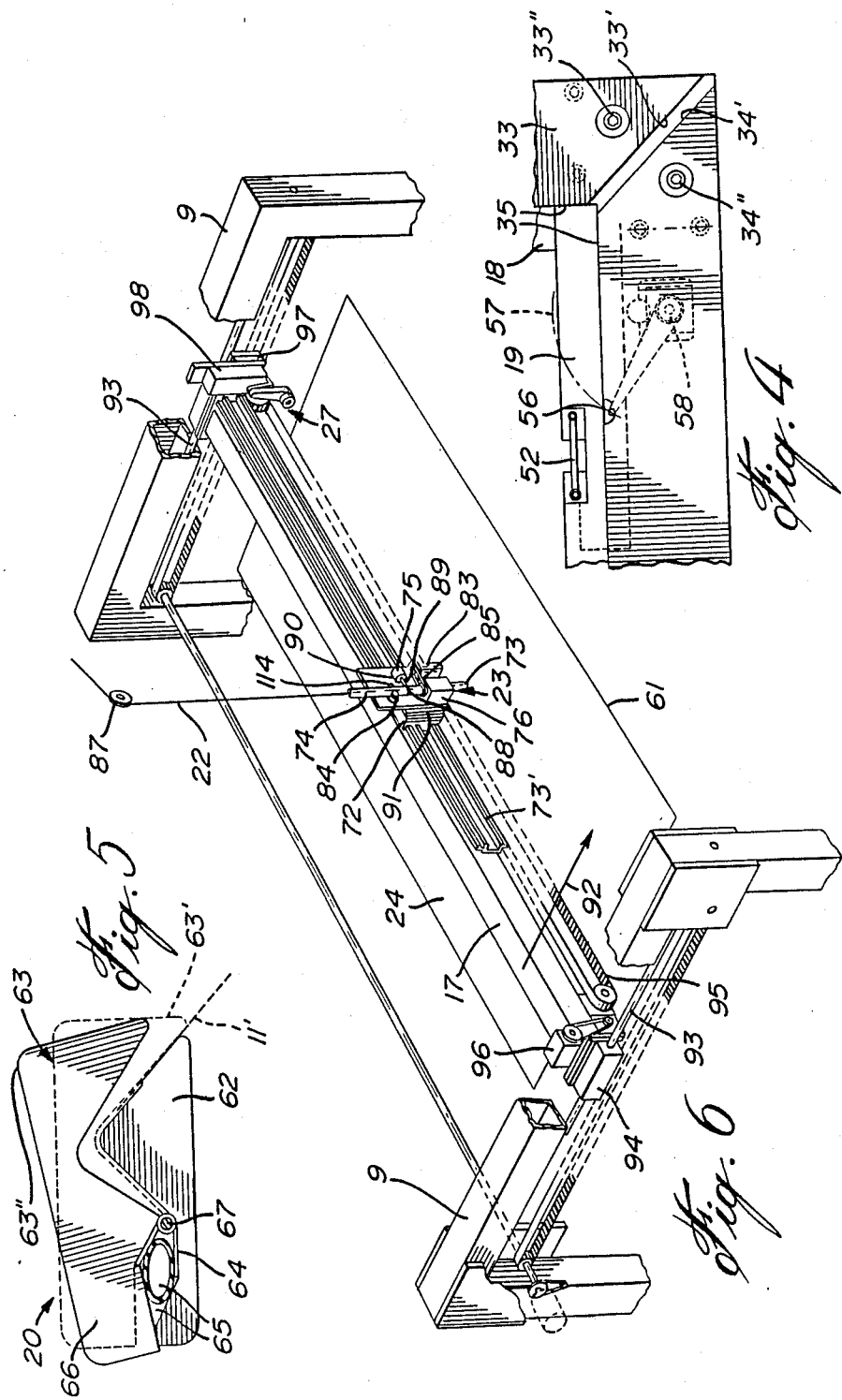

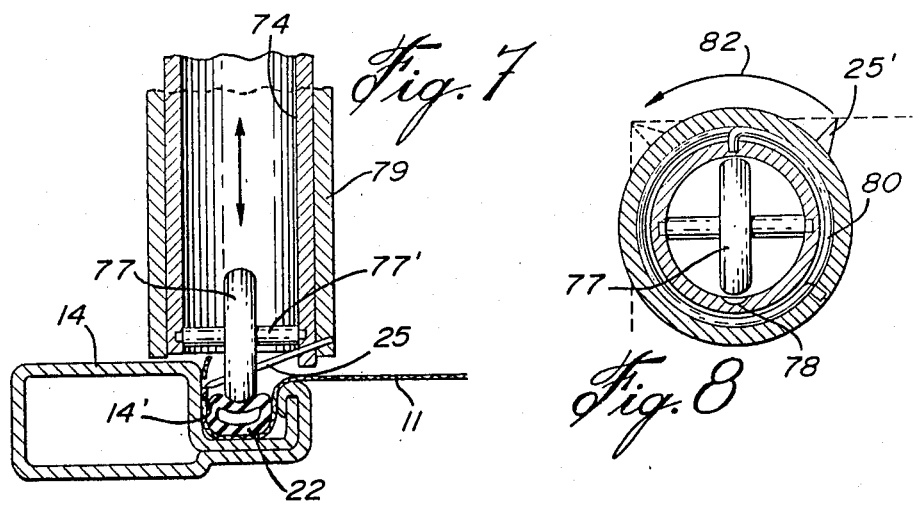
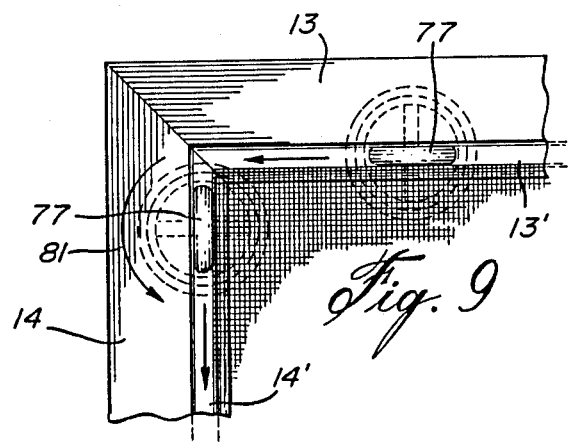
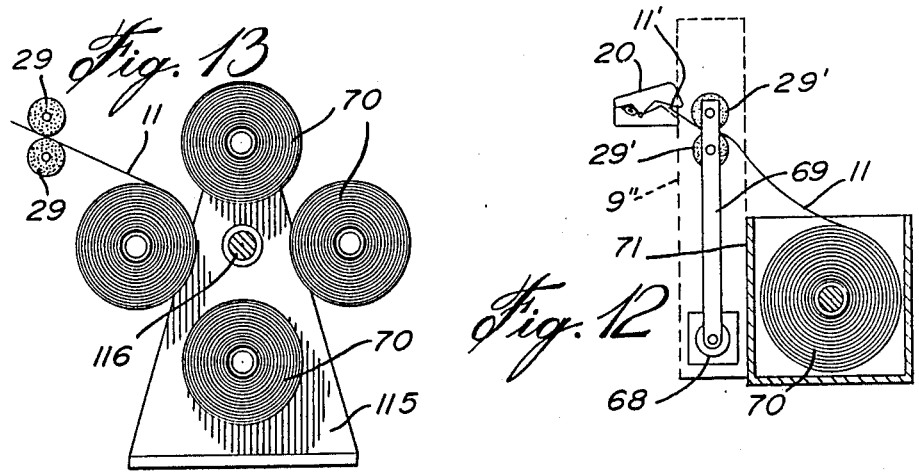

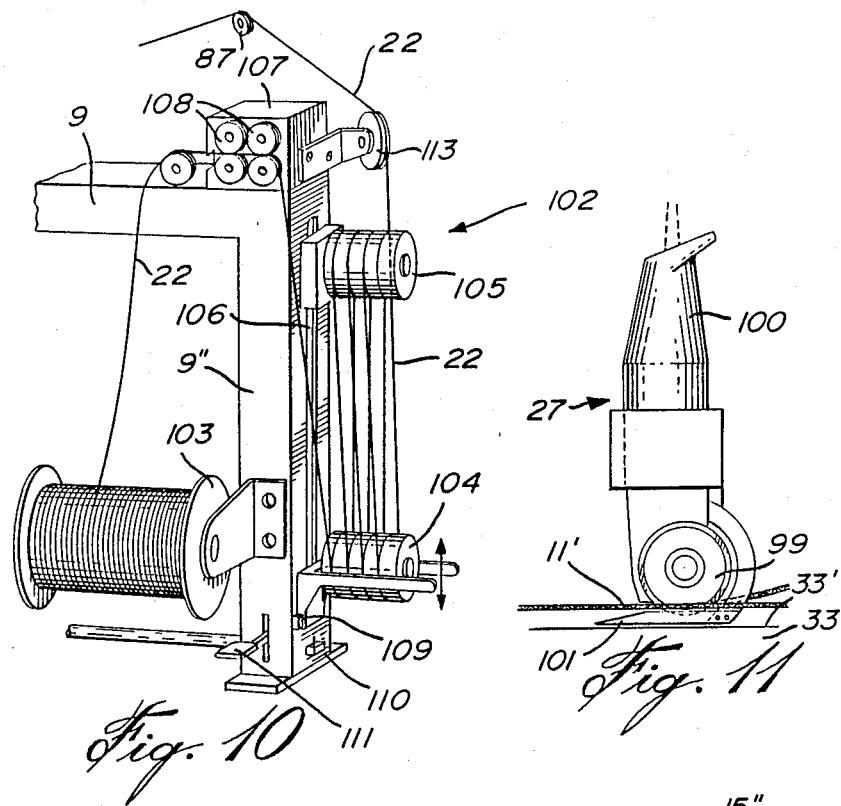
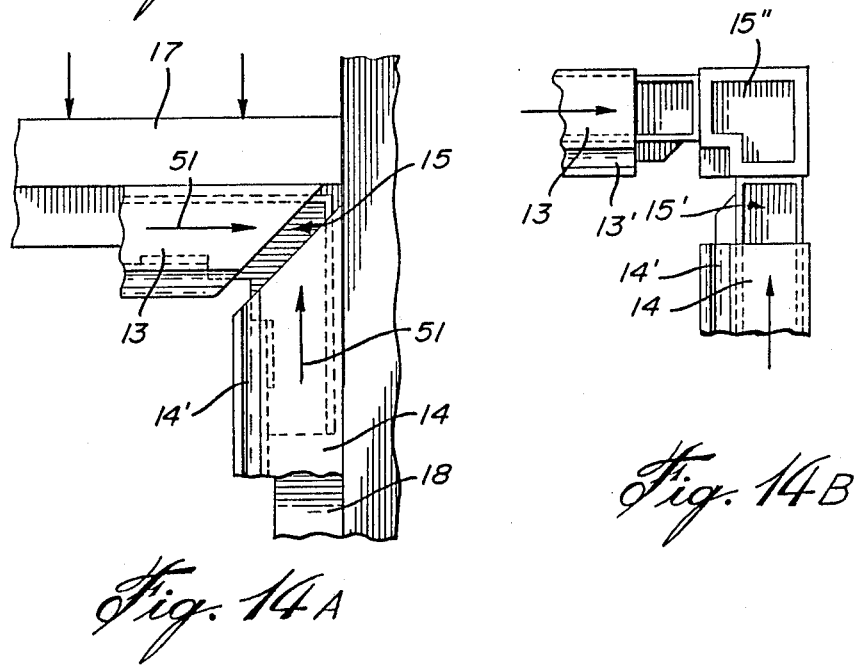

APPARATUS FOR APPLYING A FABRIC MATERIAL TO A FRAME

BACKGROUND OF INVENTION

1. Field of the Invention

The present invention relates to an improved apparatus and a method for applying a fabric material, preferably but not exclusively a wire or fiberglass cloth screen fabric to a rectangular frame having a fabric peripheral retention groove and securing the fabric material therein and wherein the apparatus is substantially entirely automatic.

2. Description of Prior Art

It is known to apply a cloth material such as a screen material to a rectangular frame by the use of substantially automatic machinery as is disclosed, for example, as disclosed in U.S. Pat. No. 2,695,445. However, such methods and apparatus have not proven successful due to various reasons such as inoperability, malfunction, machine down time, high cost, bulky machinery, and particularly slow operation. Also, with the above referenced patent, it is necessary to cut sheets of the screening material with precise dimensions, and if such sheets are not oriented perfectly over the retention frame, then an improper assembly results. Also, if the sheet material sags or has a ripple therein, then it will not be secured entirely along the retention groove of the frame.

U.S. Pat. No. 2,753,897 teaches a further method of assembling a screening material to a rectangular frame, and again in this method the fabric material is cut into sheets and secured to the frame in a die wherein the spline cord is pushed into the retention groove of the frame by a single piston action. Such a machine is very labor intensive as it requires personnel to position the spline cord, the screening sheet and the frame into the die and then actuate the die and remove the screen frame. It is also necessary to ensure that the screen is entirely flat in the die cavity and free of ripples. This method is also time consuming and not commercially feasible.

SUMMARY OF INVENTION

It is a feature of the present invention to provide an improved method and apparatus for securing a fabric material to a rectangular frame and which substantially overcomes all of the above-mentioned disadvantages of the prior art.

It is a further feature of the present invention to provide a method and apparatus for securing a wire or fiberglass cloth screen fabric to a rectangular frame and wherein the apparatus is substantially all automatic and fast to execute.

Another feature of the present invention is to provide a method and apparatus for securing a wire cloth screen fabric to a rectangular frame and wherein the fabric is fed to the frame from a continuous roll and severed only after the spline cord is applied in the retention groove of the frame.

Another feature of the present invention is to provide an adjustment means to assure for the parallelism of the frame members prior to the application of the cloth.

Another feature of the present invention is to provide a method and apparatus for securing a wire cloth screen fabric to a rectangular frame and wherein the frame corner connections are positioned to their final closed position with the frame being squared off by the machine prior to the application of the wire or fiberglass cloth screen fabric thereto.

Another feature of the present invention is to provide a method and apparatus for securing a wire or fiberglass cloth screen fabric to a rectangular frame and wherein the spline cord is positioned by a positioner device which is displaced entirely along the retention groove of the frame and which simultaneously cuts the wire cloth as it applies the spline cord, and wherein the speed of the applicator is in the range of 3 to 4 feet per second.

It is a further feature of the present invention to provide a method and apparatus for securing a wire cloth screen fabric to a rectangular frame wherein there is provided an automatic control device for effecting the entire assembly of the wire or fiberglass cloth to the rectangular frame while taking count of the number of frames assembled and the size of the frames.

According to the above features, from a broad aspect, the present invention provides an apparatus for applying a fabric material to a rectangular frame having a fabric retention groove along respective side members thereof. The apparatus comprises a frame support structure having a planar frame support surface which is comprised of two pairs of opposed parallel frame engaging members. One of the frame engaging members of each of the pairs is an adjustably displaceable frame. Each frame engaging member is further provided with gripping means for holding respective ones of the side members of the frame along a substantially straight axis and for releasing the side members after assembly. Fabric positioning means is also provided for positioning a predetermined length of the fabric material over the frame to overlie the fabric retention groove of the frame side members. A spline cord positioner is displaceable in alignment with the retention grooves for applying a spline cord in the grooves from above the fabric material to retain the material in the grooves. Cutting means is also provided for severing the fabric material from the frame.

According to another aspect of the present invention there is provided a method of securing a fabric material in a retention groove disposed circumferentially about a rectangular frame by applying a spline cord in the groove with a fabric portion being disposed therein. The method comprises storing data in an electronic controller means with data pertaining to the dimensions of a rectangular frame. A frame support structure having four frame engaging members if automatically displaced to a frame receiving position. The frame is then disposed on the frame support structure. At least two frame engaging members of the frame support structure are then moved to position side members of the frame to a desired configuration. The side members are gripped by gripping means to maintain the side members along respective straight transverse axes. A predetermined length of the fabric material is then positioned over the frame to overlie the retention groove in the side members. A spline cord positioner is then displaced to a predetermined position on one of the side members of the frame. A spline cord is then disposed in the groove of the side members of the frame by displacing the positioner along the entire length of the grooves in the side members while forcing the spline cord in the groove over a portion of the fabric. Simultaneously, the fabric is trimmed adjacent the spline cord in the groove. The spline cord is then severed and the fabric is cut to disconnect same from a supply. The assembled frame is then disconnected from the frame support structure.

BRIEF DESCRIPTION OF DRAWINGS

A preferred embodiment of the present invention will now be described with reference to the example thereof as illustrated in the accompanying drawings, in which:

FIG. 1 is a simplified top view of the apparatus showing parts thereof in schematic form;

FIG. 2 is a perspective view showing the elements constituting the frame engaging members;

FIG. 3A is section view of a stationary frame engaging member;

FIG. 3B is a simplified side view showing the construction of the gripping means;

FIG. 4 is an enlarged top view of the corner intersection of the stationary frame engaging members illustrating the construction of the displaceable bars and ejectors;

FIG. 5 is a side view of the jaw member constituting the fabric positioning means;

FIG. 6 is a simplified perspective view showing the construction of the spline cord positioner and its bridge bar;

FIG. 7 is a simplified fragmented section view showing the construction of the cord applicator head and its position relative to the retention groove of a frame member;

FIG. 8 is a section view showing the spring coupling between the inner and outer cylinders of the cord applicator head of FIG. 7;

FIG. 9 is a schematic view showing the displacement of the cord applicator head along a corner portion of a rectangular frame;

FIG. 10 is a schematic perspective view of the spline cord accumulator mechanism;

FIG. 11 is a side view of the screen mesh cutting device;

FIG. 12 is a schematic view showing a supply roll of screen fabric material and its relationship with respect to the pincer drive rolls and the jaw bar fabric positioner;

FIG. 13 is a simplified schematic view illustrating a turret frame supply device; and FIGS. 14A and 14B are fragmented top views showing two different types of corner connectors for screen supporting rectangular frames.

DESCRIPTION OF PREFERRED EMBODIMENTS

Referring now to the drawings, and more particularly to FIG. 1, there is shown the fabric applying apparatus 10 of the present invention for securing a fabric material 11, herein a wire cloth screen fabric, to a rectangular frame 12. The rectangular frame 12 is constructed of four side members with the pair of side frame members 13 being disposed parallel to one another and the end pair of transverse side members 14 also disposed parallel to one another. Each of the side members 13 and 14 are connected at their corners by corner connectors 15 and 15' respectively, as shown in FIGS. 14A and 14B.

The frame 12 is disposed on a planar frame support surface which is comprised by two pairs of opposed parallel frame engaging members 16-19. The frame engaging members consist of two adjustably displaceable frames 16 and 17 and two stationary frames 18 and 19. These frame engaging members 16-19 retain the pair of rectangular frame side members 13 and 14 in a squared off position prior to the application of the wire cloth material 11 thereover.

Disposed over the frame engaging members 16-19 is an elongated jaw bar member 20 which is displaceable to a "pick up" position adjacent the end beam structure 21 of the support structure 9 where the jaw bar member 20 will engage a leading edge 11' (see FIGS. 5 and 12) of the wire cloth screen fabric 11 and pull same over the frame side members 13 and 14 so that the fabric material overlies the retention grooves 13' and 14' of the pairs of side members 13 and 14.

A spline cord 22 feeds a positioner device 23 which is secured and displaceable along a displaceable bridge bar 24 whereby to apply the spline cord 22 in the grooves 13' and 14' of the side members 13 and 14 and over the fabric material 11 positioned across the frame, whereby to retain the fabric material 11 captive within the grooves 13' and 14'. As the spline cord 22 is applied within the grooves, a trimming knife 25 (see FIG. 7) associated with the positioner 23 severs the screen within the grooves of the frame side members 13 and 14. At a predetermined position along the circumferential groove of the frame, the spline cord 22 is severed and the positioner terminates its cord application path. Thereafter, the positioner head 23 (see FIG. 6) is disengaged from the frame and the bridge bar 24 is moved to the forward end position 26 of the support structure where a trimming device 27 attached to bridge 17 (see FIGS. 6) engages the screen material and cuts it along a straight line as the bridge bar 24 is retracted as required across the support structure to a rearward end position toward 28. The pincer rolls 29' (see FIG. 12) then retract the fabric to position the leading edge 11' of the screen fabric to a receiving position for the jaw member to engage in the next cycle.

As shown in FIG. 1, an electronic conroller module 29 is also provided and has a display screen 30 for displaying various stored information in the memory of the control device. Keyboards 30' are also provided to enter information within the control module 29. This module also controls various circuits and switches in the control panel 31 to effect the automatic control of the various parts of the machine mounted on the support structure 9. For example, the module 29 will store data relating to the dimensions of the rectangular frames, the quantity of the frames to be assembled, the length of spline cord 22 remaining in its storage spool, the length of wire cloth screen also remaining in it supply pool, etc.

As also shown in FIG. 1, an accumulator device 32 is also provided to accumulate and dispense spline cord 22 to the positioner 23. The construction and operation of this device will be described in detail later.

Referring now to FIGS. 2 to 4, and 14A and 14B, there is shown the construction of the frame engaging members 16, 17, 18 and 19. Each opposed pair of these members has a displaceable member and a stationary member with members 16 and 17 being displaceable, and members 18 and 19 being stationary. The stationary members 18 and 19 are each provided with displaceable flat bars 33 and 34 to apply clamping pressure on the frame side members to ensure proper corner connections. The adjacent ends 33' and 34' of these bars are spaced apart from one another a predetermined distance and pivotally connected at a pivot connection 33" and 34" to flat support bars 18' and 19'. The flat support bars extend beyond a straight vertical abutting edge 35 of each of the plates 33 and 34 to constitute a frame abutting edge surface which extends at right angles with the top surface of the support bar 18' and 19'. When the frame side member is positioned on the top surface of the bar 18' adjacent the abutting edge 35 and the displaceable frame members 16 and 17 have all moved into position to close the frame side members at their corner connections, as shown in FIGS. 14A and 14B, these displaceable bars 33 and 34 will move inwardly in the direction of arrows 36 whereby to ensure that all the corner connectors 15 and 15' are properly secured.

The adjustably displaceable frame member 17 is constituted by a flat bar member 38 having a flat support surface and a right angle rear plate 39 spaced rearwardly of the forward edge of the flat support bar 38. This displaceable frame member 17 is interconnected at opposed ends thereof on a support guide block 37 which is secured to a respective one of opposed parallel guide rods 40 and displaced thereon by drive means in the form of a link belt 41 driven by suitable motor means (not shown). The link belt provides accurate parallel displacement of the displaceable frame member 17 with respect to the stationary frame member 19.

The other adjustably displaceable frame 16 is constituted by a plurality of frame retention blocks 42 which are axially displaceably mounted on the bridge arm 43 whereby to move closer or further away from one another by means of an accordion link connector 44. This connector comprises a plurality of pivotally connected bars 45 arranged in a criss-cross manner, as is well in the art. The accordion connector 44 is also connected to the other adjustably displaceable frame 17 which moves at right angles to the straight bridge arm 43, and by doing so displaces the retention blocks 42 toward or away from each other as the frame 17 is displaced. Each of these blocks 42 has a frame support surface 46 and a straight frame abutting edge 47 extending at right angles to the surface 46.

The straight bridge arm 43 is also secured at opposed ends thereof to a respective one of opposed guide rods 48 which are secured parallel to one another in channel members 9' of the support structure 9. The arm 43 is displaceable on these guide rods 48 by drive means which is also constituted by a pair of link belts 49 driven by motor means (not shown) whereby to displace the bridge arm 43 and the blocks 42 in parallel relationship with respect to the stationary frame engaging member 18.

In operation, the adjustable frame members 16 and 17 are moved to a frame receiving position which is determined by the data supplied in the control module 29 and an operator places a preassembled frame in the condition, as shown in FIGS. 14A and 14B, wherein the side members 13 and 14 are not fully engaged with their connectors 15. This last assembling step is made by the machine as soon as the operator depresses pedal 50 after the frame is positioned on the support surfaces of the stationary and displaceable frame members 16–19. The displaceable frame members then advance to effect a corner closure of the partially assembled corner connectors 15 of the frame. When the displaceable frame members 16 and 17 are displaced, the side members 13 and 14 will move in the direction of arrows 51, as shown in FIG. 14A. FIG. 14B shows a different corner connectors wherein the ends of the side members 13 and 14 are squared and the channel portions 13' and 14' are cut at 45 degrees to form an abutment end and a continuous channel in the corner section of the frame. The connector 15' is herein shown as an injection molded plastic corner piece with a square corner portion 15" thereof being exposed.

After the frame is rigidly squared off and retained by the frame engaging members, a gripping means, as shown in FIGS. 3A and 3B, in the form of an abutting link finger 52 is moved to an engaging clamping position as shown in FIG. 3 with the frame side member 15 being clamped between the abutting straight edge 35 and the finger element 52 whereby to clamp the side member to maintain it along a straight axis guided by the abutting straight edge 35. Accordingly, all of the side members of the frame are retained rigidly along straight transverse axes. The gripping means is a chain link 53 disposed about a drive sprocket 54 and an idle sprocket 55 whereby to position the link finger 52 against the frame member 12. The finger 52 is retracted under the flat support base 18' when in a nonclamping position. As shown in FIG. 2, such gripping fingers 52 are located at predetermined locations under the inner edge of the displaceable and stationary frame engaging members. The gripping means will be activated only where a frame will be positioned.

Referring to FIGS. 2 and 4, there is also shown the provision of ejector pins 56 mounted in the stationary and displaceable frame engaging members. These ejector pins are located in a slot cavity (not shown) under the flat support surfaces 33, 34, 39 and 47 of the stationary and displaceable frame members and are movable outwardly along an arc, such as 57 in FIG. 4, about a pivot connection 58. Only a single ejector 56 is provided on the accordion blocks 42. However, these are provided in a spaced apart manner along the other frame members to ensure that an ejector is present when small or large frames are assembled. For this reason, the ejector pins 56 are located close to the corner pivot connection of the bars 33 and 34 and also close to the end of the bar 17. These ejector pins assure that the frame is released from the stationary and displaceable frame engaging members for the release of the frame in the area 59 between these members and onto a conveyor belt 60 displaceably movable thereunder, whereby to eject the frame and the screen excess clippings after an assembly cycle.

After the frame side members are rigidly held and positioned and aligned by its planar frame support members, the plane of which is depicted by numeral 61 in FIG. 6, the elongated jaw bar member 20 (see FIGS. 1, 5 and 12) moves to its "pick up" position, as shown in FIG. 12, where the jaws are opened to receive the leading edge of the screen material 11 and closed to engage the leading edge portion 11' of the screen material 11. As shown in FIG. 5, the jaw member comprises a lower stationary jaw member 62 and a pivoted top jaw member 63 interconnected by a hinge member 64. A chamber 65 is defined between both members adjacent the hinge member 64 and an inflatable tube 66 is disposed longitudinally in this chamber 65. By inflating the tube 65 the pivoted jaw member 63 is caused to move to its position as shown at 63', and namely its closed position. When the tube 65 is deflated, the pivoted jaw member 63 rises to its open position, as shown at 63", due to the counter weight in the rear portion 66 thereof being heavier than the front portion forwardly of the hinge pin 67. As soon as the jaw is closed to retain the leading edge 11' of the material, the pincer rolls 29 are then driven by a drive servo motor 68 which is interconnected by a link belt 69 whereby to release a predetermined amount of screen material from the roll 70 of material contained in the bin 71. At the same time as the motor 68 is actuated, a piston means applies a retracting force 72 to the elongated jaw bar member 20 whereby to pull the fabric 11 and maintain it taut but unstretched, whereby to prevent sagging and rippling therein. As soon as the proper length of fabric is released by the pincer rolls, the pressure in the cylinder (not shown) pushing the jaw member is released and the screen material 11 is positioned to overlap at least the retention grooves of the side members 13 and 14 of the frame. The spline cord positioner 23 and its associated bridge bar 24 then moves into position over the retention groove of the outermost side member, and that is the one secured to the displaceable frame engaging member 17. Preferably, but not exclusively, this position is at a predetermined location along one of the side members and not in the corners of the frame whereby to provide more rigidity in the corner by eliminating a spline joint at that position.

Referring now more specifically to FIGS. 6 to 9, there will be described the construction of the spline cord positioner 23. As herein shown, the positioner is provided on a displaceable carriage 72 which is secured to a guide rail 73' attached to the bridge bar 24. The positioner 23 has an applicator head 73, a cord guide tube 74, and cord severing means 75 associated with the cord guide tube. As shown in FIG. 7, a trimming blade element 25 is also associated with the cord applicator head 73 for severing the screen fabric 11 in the groove of the frame side members adjacent the cord 22 positioned therein.

As shown additionally in FIG. 7, the cord applicator head comprises a vertically displaceable support cylinder 74 supporting a cord positioning wheel 77 on an axle 77' at a lower end thereof. A guide channel 78 locates the spline cord 22 under the wheel 77. A drive wheel 114 holds and advances the cord 22 in the cylinder 74. An outer cylinder 79 is axially rotatable independently of the inner cylinder and connected to the inner cylinder 74, at its top periphery by a torsion spring 80 whereby to position the cutting edge 25' of the trimming element 25 at a predetermined location behind the wheel 77 whereby to sever the screen material 11 in the groove 14' of the frame member 14. The torsion spring 80 also applies pressure on the cutting edge and permits the blade cutting edge 25' to be displaced around the corner portions of the frame, such as shown by arrow 81 in FIG. 9, and along the arc 82 as shown in FIG. 8, whereby the blade reassumes its normal biased position with respect to the planar axis of the wheel 77. This spring connection 80 is inside the housing 76.

It is pointed out that when the wheel reaches the corner position of a frame, the control module 29 has this information in memory and automatically causes the inner cylinder 74 to retract or move upwardly within the outer cylinder 79 to lift the wheel by means of the friction coupling of a top extension portion of the inner cylinder 74 which is in friction coupling with a drive wheel 84 which is operated to move the inner cylinder upwardly or downwardly. The wheel 77 is then rotated by rotating the inner cylinder 74 which is coupled to motor 83 by a link belt 85. After the wheel 77 has been oriented at a right angle it is then lowered in the right angle groove 14' of the adjacent frame side member 14. As soon as the wheel proceeds from the corner position, the torsion spring 80 has been wound a quarter turn and will move the cutting edge 25 of the blade along the arc 82 as soon as the positioner advances whereby to sever the screen material in the corner portion and reassume its normal position, as shown in FIG. 8.

The upper portion of the inner cylinder 74 also constitutes a guide for the spline cord 22 as shown in FIG. 6. Preferably, but not exclusively, the spline cord 22 is also suspended centrally over the frame by a pulley 87 whereby to have minimum distortion and drag on the spline cord. Before the cord applicator head 73 reaches its initial starting position along the side frame member during a spline application cycle, at a predetermined distance from this position, the extension portion of the inner cylinder has reassumed its initial axial position. An opening or slit 88 in the cylinder 74 is aligned with a cutting blade 89 which is actuated in and out of the opening 88 by an air cylinder (actuator) 90 whereby to sever the cord, at a predetermined length whereby the free end of the cord will terminate very close to the starting end of the cord within the retention groove of the frame. After the cord application cycle is terminated, a displaceable connector block 91 is commanded to move upwardly to displace the cord applicator head 73 from the frame to permit the frame and the screen material secured thereto to be released. It is pointed out that the spline cord is applied at a speed of 3 to 4 feet per second and that total assembly time of a frame, of approximately 2 feet by 3 feet, would take approximately 20 seconds. Also, the spline cord is applied about the frame with the ends of the spline cord lying within a tolerance of $\frac{1}{8}$ of an inch from each other.

Referring now more particularly to FIGS. 6 and 11, there will be described the operation and construction of the cutting device 27. After the spline cord positioner 23 has lifted, the bridge bar 24 advances in the direction of arrow 92 to a screen fabric trimming position. At that stage of the assembly, the jaw bar 20 still engages the fabric leading edge and side sections of the fabric, which have not been cut remain taut with the pincer rolls 29. The bridge bar is displaceable on a pair of opposed guide rods 93 through a support coupling 94 at opposed ends of the bridge bar. The displacement of the carriage 72 is effected by a link belt 95 which is driven by a motor 96 and all controlled by the control module 29. The cutting device 27 is also secured to a carriage 97 displaceable on the guide rod 93 at the feed end of the fabric and is displaceable relative to the bridge bar 24. A vertically displaceable coupling 98 is actuable whereby to move the cutting device 27 along a vertical axis whereby the trimming device may be positioned to receive the side edge of the fabric material.

As shown in FIG. 11 the cutting device comprises a cutting wheel 99 secured to a displaceable support 100. A guide plate 101 positions a free edge portion 11' of the fabric 11 elevated from the upper surface 33' of the movable bar 33 and locates the screen material on the guide plate and under the cutting wheel 99 whereby to sever same. By retracting the bridge bar 24 the cutting device is also retracted and the wheel 99 cuts the screen entirely across its width. Thereafter, the bridge bar retracts a predetermined distance, in this particular case 3 inches, and the ejectors 56 are actuated to make sure that the frame side members are released from their frame engaging members. The frame engaging member 16 having the blocks 42 is then retracted and the assembled frame and screen clippings fall on the lower conveyor 60.

As previously described, the spline cord positioner operates very quickly and therefore minimum drag and resistance in the spline cord is desired. For this purpose, there is provided a cord accumulator 102, as shown in FIG. 10. The cord accumulator permits a predetermined length of spline cord 22 to be applied by the positioner device 23 without having to dispense the spline cord from a storage spool 103 where considerable resistance to pulling would be present due to friction and the weight of the roll. The cord accumulator 102 comprises a pair of spaced apart guide rolls, herein a lower vertically displaceable roll 104 and a stationary upper roll 105. The lower roll 104 is vertically displaceable along a guide track 106 secured to the vertical side members 9″ of the support structure 9. As herein shown, there are various loops of spline cord 22 wound about these rolls, and the number of these loops is calculated to provide an ample storage length of the cord to permit the positioner to apply the spline cord without the need of pulling or having to simultaneously dispense cord from the storage spool 103. As soon as the cord begins to be dispensed by the positioner 23, the lower roll 104 moves upwardly along its guide track 106 and the spline cord is dispensed quickly with minimum resistance.

As soon as the positioner is lifted from the frame member, after the application cycle of the spline cord is terminated, a cord dispensing drive device 107 is actuated to rotate its drive wheels 108 which dispense a predetermined quantity spline cord 22. As the spline cord is dispensed, the weight of the lower roll 104 (which is fairly light) causes the roll to move downward and to store the spline cord about both rolls. As soon as the lower roll has reached a predetermined lower position, a stop switch 109 is activated by the roll support whereby to stop the dispensing drive device 107. A further switch 110 is located below the stop switch 109 and this switch is activated should the spline cord 22 be accidentally released from the cord positioner 23, or for any other reason, break. Once the lower spool 104 touches the switch 110, the operation of the device stops and an alarm is actuated. A foot pedal 111 is also provided for threading the spline cord 22 through the cord dispensing drive wheels 108 when a new spool 103 is positioned on the spool support shaft 112. A length of spline cord is threaded about the rolls 104 and 105, the guide pulley 113, and the suspension pulley 87, and back into the positioner 23. The spline cord is prevented from being withdrawn by the cord engaging drive wheel 114 associated with the cylinder 74.

Referring now to FIG. 13, there is illustrated a modification of the supply end of the machine and wherein a plurality of rolls 70 of screen fabric may be supported on a turret frame 115 about a support shaft 116 whereby to selectively position a predetermined one of the rolls 70 for supplying the pincer rolls 29. These various rolls 70 may, for instance, be of varying widths or be of the same widths but arranged on this turret frame for quick connection to the machine to provide minimum machine down time in interchanging fabric rolls. It is also within the ambit of the present invention to provide different types of fabric such as for the fabrication of silk screen or even provide plastic film materials, such as polyethylene to assemble plastic insulation frames. The material could also be applied to both sides of the frames by providing a frame with opposed grooves, and not necessarily aligned. The assembled frame, with one sheet secured thereto, may be repositioned in reverse onto the frame engaging members for the application of the second sheet on the opposite side of the frame. All that is necessary to do to effect such an operation is to program this information into the control module 29 and the machine will automatically adjust for a different location of the retention groove and length of spline cord.

It is within the ambit of the present invention to cover any other obvious modifications of the preferred embodiment described herein, provided such modifications fall within the scope of the appended claims.

I claim:

1. An apparatus for applying a fabric material to a rectangular frame having a fabric retention groove along respective side members thereof, said apparatus comprising a support structure having a planar frame support surface which is comprised of two pairs of opposed parallel frame engaging members, one of said frame engaging members of each said pairs is an adjustably displaceable frame, each frame engaging member having gripping means for clamping a respective one of said side members of said frame along a substantially straight axis when actuated to a gripping position and for releasing said side members when actuated to a release position, the other ones of said frame engaging members of each said pairs are stationary and provided with displaceable bars to apply clamping pressure on said side members of said frame to ensure proper corner connections, an adjacent end of said displaceable bars are spaced from one another and pivotally connected on a flat support plate, said support plate exceeding a straight frame abutting edge of said other ones of said frame engaging members to constitute a frame support surface, said frame abutting edge extending at right angles to said frame support surface, fabric positioning means for positioning a predetermined length of said fabric material over said frame to overlie said fabric retention groove of said frame side members, a spline cord positioner displaceable in alignment with said retention grooves for applying a spline cord in said grooves from above said fabric material to retain said material in said grooves, and cutting means for severing said fabric material from said frame.

2. An apparatus as claimed in claim 1 wherein said fabric is a wire or fiberglass cloth screen fabric.

3. An apparatus as claimed in claim 1 wherein one of said adjustably displaceable frame is a displaceable bar interconnected at opposed ends thereof on support guide means, and drive means for displacing said support guide means to move said bar parallel to an opposite stationary frame engaging member of a pair thereof.

4. An apparatus as claimed in claim 3 wherein there is further provided conveyor means for transporting said frame after said screen fabric has been secured thereto an unloading area of said support structure.

5. An apparatus as claimed in claim 4 wherein said conveyor means comprises conveyor belts disposed under said frame engaging members, said conveyor belts also transporting loose screen cuttings.

6. An apparatus as claimed in claim 3 wherein said bar has a straight frame engaging edge extending at right angles to an adjacent frame support surface of said flat support plate.

7. An apparatus as claimed in claim 3 wherein said support guide means is a straight guide rod secured to said support structure and a guide block displaceable along said rod and secured to a respective end of said opposed ends of said bar, said drive means constituted by a pair of driven link belts and each secured to a respective guide block for displacing said bar to a predetermined position parallel to said opposite frame engaging member.

8. An apparatus as claimed in claim 3 wherein the other of said adjustably displaceable frame is constituted by a plurality of frame retention blocks axially displaceable on a straight bridge arm, and drive means for displacing said bridge arm parallel to an opposite stationary frame engaging member of a pair thereof.

9. An apparatus as claimed in claim 8 wherein there is further provided automatic control means having electronic storage means for storing data related to said rectangular frame dimension and quantity of frames to be assembled, said control means effecting the sequential operation of drive means to automatically assemble individual ones of said frame and screen fabric upon receipt of a starting signal.

10. An apparatus as claimed in claim 8 wherein said frame retention blocks are connected to adjacent blocks by an accordion link connector whereby said blocks are axially displaceable closer or further from one another depending on the displacement of said displaceable bar.

11. An apparatus as claimed in claim 10 wherein said accordion link connector is secured to said displaceable bar which is displaceable at right angles thereto, each said block having a frame support surface and a straight frame abutting edge extending at right angles to said frame support surface.

12. An apparatus as claimed in claim 11 wherein said bridge arm is secured at opposed ends thereof to a respective guide rod secured to said support structure, said bridge arm being displaceable on said guide rods by said drive means constituted by a pair of driven link belts and each secured to a respective end of said bridge arm for displacing same to a predetermined position parallel to said opposite frame engaging member of a pair thereof.

13. An apparatus as claimed in claim 8 wherein said gripping means is an abutting element displaceable to a clamping position adjacent a frame abutting straight edge disposed at right angles to a frame support surface of said stationary and adjustable frame engaging members whereby to clamp each said side members of said frame against said frame abutting straight edge to maintain said side members along straight axes.

14. An apparatus as claimed in claim 13 wherein said abutting element is constituted by a link finger element secured to a chainlink of a chain drive motor disposed under said frame support surface and operable to apply or withdraw said finger element from clamping pressure against a respective one of said frame side members.

15. An apparatus as claimed in claim 8 wherein there is further provided ejector means secured at spaced apart locations on said stationary frame engaging members and said displaceable bar, said ejector means also being secured to at least one of said frame retention blocks.

16. An apparatus as claimed in claim 15 wherein said ejector means is an ejector pin displaceable in and out of a frame abutting straight edge disposed at right angles to a frame support surface of said stationary and adjustable frame engaging members whereby to displace said frame side members away from said frame abutting straight edge.

17. An apparatus as claimed in claim 3 wherein said spline cord positioner is a displaceable carriage which is displaceably secured to a support bridge bar and axially movable therealong; said carriage having a cord applicator head, cord guide means and cord severing means.

18. An apparatus as claimed in claim 17 wherein there is further provided cord accumulator means for permitting a predetermined length of cord to be applied by said cord applicator head without having to dispense said cord from a storage spool whereby there is minimum drag on said cord 19. An apparatus as claimed in claim 18 wherein said cord accumulator means comprises a pair of spaced apart guide rolls having a predetermined length of cord wound therebetween, a lower one of said rolls being displaceably mounted along a vertical guide means and moving closer to an upper roll by the application of a pulling force on said cord by said cord applicator head, said lower roll descending along said guide means when a cord dispensing drive is operated, and switch means to shut off said cord dispensing device.

20. An apparatus as claimed in claim 19 wherein said switch means is actuated by said lower roll when reaching a predetermined position along said guide means.

21. An apparatus as claimed in claim 20 wherein there is further provided second switch means which is actuable by said lower roll when tension is removed from said cord wound about said rolls causing said lower roll to fall by gravity to a lower end of said guide means.

22. An apparatus as claimed in claim 17 wherein there is further provided a trimming element secured to said cord applicator head for severing said screen fabric in said groove of said frame side members adjacent said cord positioned therein.

23. An apparatus as claimed in claim 17 wherein said cord applicator head comprises a vertically displaceable support having a cord positioning wheel for positioning said spline cord within said retention groove of said frame side members. said vertically displaceable support having a rotatable coupling for orienting said wheel along right angle axes.

24. An apparatus as claimed in claim 23 wherein said vertically displaceable support is an inner cylinder movably secured within an outer cylinder, said outer cylinder being axially rotatable independently of said inner cylinder, and a torsion spring rotatably coupling said outer cylinder to said inner cylinder with said trimming element positioned relative to said wheel position.

25. An apparatus as claimed in claim 24 wherein said trimming element is a blade having a cutting edge spring biased against an inner wall of said retention groove of said frame side elements by said torsion spring.

26. An apparatus as claimed in claim 25 wherein said cord guide means is constituted by an extension portion of said inner cylinder, said inner cylinder being displaceable along its longitudinal axis to move said wheel in and out of said frame retention groove.

27. An apparatus as claimed in claim 26 wherein said extension portion is in friction coupling with a rotatably driven drive wheel to effect said axial displacement, and cord engaging means associated with said extension portion.

28. An apparatus as claimed in claim 26 wherein said cord severing means is a cutting element displaceable in and out of a slot in said extension portion below said cord engaging means to intersect and sever said cord when said inner cylinder is in a lowered position with said positioning wheel in said retention groove of said frame side members.

29. An apparatus as claimed in claim 17 wherein said displaceable carriage is secured to a track coupling which is displaceably secured to a track extending along said support bridge bar, said track coupling having a displaceable connector to move said carriage along a vertical axis to a cord application position and to a retracted position, and drive means to displace said carriage along said track.

30. An apparatus as claimed in claim 3 wherein said positioning means is an elongated jaw bar member displaceably secured to said support structure and displaceable in parallelism with one of said stationary frame engaging member, said jaw member having a gripping jaw, said gripping jaw having a stationary jaw member and a pivoted jaw member to define an articulated mouth opening to clamp a leading edge portion of said screen fabric, said screen fabric being provided as a continuous length of fabric with said leading edge portion clamped between a pair of pincer drive rolls with at least one of said pincer drive rolls being rotatably driven.

31. An apparatus as claimed in claim 30 wherein said elongated jaw member is displaced to a fabric pick up position and guided to a fabric positioning position by said pincer rolls, said pincer rolls delivering a predetermined length of said screen fabric with said jaw member applying a slight pulling force to prevent said fabric from sagging and to maintain it in planar alignment over said planar frame support.

32. An apparatus as claimed in claim 30 wherein said pivoted jaw member and said stationary jaw member are interconnected by a hinge member connection, said pivoted jaw member being normally biased to an open jaw position by its weight distribution relative to said hinge position, a jaw activating member disposed in a cavity adjacent said hinge member connection for urging said jaw members to a closed mouth position.

33. An apparatus as claimed in claim 32 wherein said jaw activating member is an inflatable tube, said tube when inflated urging said pivoted jaw member to tilt on said hinge connection to move said jaw members to a closed mouth position.

34. An apparatus as claimed in claim 30 wherein said screen fabric is provided as a roll having a predetermined continuous length thereon.

35. An apparatus as claimed in claim 34 wherein two or more rolls of said screen fabrics are supported on a turret frame to position a selected roll of said screen fabric adjacent said pincer rolls.

36. An apparatus as claimed in claim 1 wherein said cutting means is constituted by a trimming blade associated with said spline cord positioner for severing said screen fabric adjacent said spline cord when positioned in said groove of said frame side members, and a screen cutting device displaceable across said screen fabric and adjacent a pair of pincer rolls which feed a predetermined length of said screen fabric.

37. An apparatus as claimed in claim 36 wherein said screen cutting device comprises a cutting wheel secured to a displaceable support, and a guide plate to guide said screen fabric under said cutting wheel.

38. An apparatus as claimed in claim 37 wherein said displaceable support is vertically adjustable to position said guide plate at a desired height, said displaceable support being secured to drive means for displacing same along straight guide means and back to its initial position.

* * * * *